United States Patent [11] 3,612,986

| [72] | Inventors | William L. Rollwitz<br>San Antonio;<br>John P. Claassen, San Antonio; John<br>Arambula, Austin, all of Tex. |
|---|---|---|
| [21] | Appl. No. | 18,799 |
| [22] | Filed | Mar. 16, 1970 |
| [45] | Patented | Oct. 12, 1971 |
| [73] | Assignee | Southwest Research Institute<br>Continuation of application Ser. No.<br>654,801, July 20, 1967, now abandoned. |

[54] SENSING APPARATUS FOR USE WITH MAGNETOABSORPTION APPARATUS USING SEMICYLINDRICAL COILS
3 Claims, 10 Drawing Figs.
[52] U.S. Cl. .................................................. 324/34 R,
324/34 ST
[51] Int. Cl. .................................................. G01r 33/12
[50] Field of Search .......................................... 324/34, 43,
34 S; 73/133 B

[56] References Cited
UNITED STATES PATENTS

| 2,370,845 | 3/1945 | Davis | 324/34.1 |
| 2,553,833 | 5/1951 | Rifenbergh | 324/34.1 |
| 2,557,393 | 6/1951 | Rifenbergh | 324/34.1 |
| 2,909,725 | 10/1959 | Bell | 324/0.5 |
| 2,939,072 | 5/1960 | Bell | 324/34 |
| 2,975,360 | 3/1961 | Bell | 324/43 |
| 3,153,201 | 10/1964 | Knight | 324/0.5 |
| 3,311,318 | 3/1967 | Quittner | 324/34.1 |
| 3,427,872 | 2/1969 | Leep et al. | 324/34 |

FOREIGN PATENTS

| 850,733 | 10/1960 | Great Britain | 324/34 |

Primary Examiner—Alfred E. Smith
Assistant Examiner—R. J. Corcoran
Attorney—Donald Gunn ABSTRACT: In magnetoabsorption apparatus, sensing apparatus having the preferred form of a radio frequency probe coil movable relative to a specimen having stress therein sensitive to stress magnitude and direction. The coil is connected to a sensing device. The coil includes a sufficient number of turns to form a signal of adequate strength to the magnetoabsorption apparatus to indicate the stress at various points on or about the specimen. The coil is connected through tuned circuits, transformer coupling circuits and other coupling circuits which improve the quality of operation by actually changing operation of the sensing device.

William L. Rollwitz
John P. Claassen
John Arambula
INVENTORS

BY L. Donald Gunn
ATTORNEY

William L. Rollwitz
John P. Claassen
John Arambula
INVENTORS

BY Donald Gunn

ATTORNEY

PATENTED OCT 12 1971 3,612,986

William L. Rollwitz
John P. Claassen
John Arambula
INVENTORS

BY Donald Gunn

ATTORNEY

SENSING APPARATUS FOR USE WITH MAGNETOABSORPTION APPARATUS USING SEMICYLINDRICAL COILS

This is a continuation of application, Ser. No. 654,801, filed July 20, 1967, and now abandoned.

RELATED APPLICATIONS

Applicants have a related application entitled "Magnetoabsorption Apparatus for Measuring Stress in Ferromagnetic and Nonferromagnetic Materials," filed of even date herewith on July 20, 1967, bearing Ser. No. 654,800, now abandoned, and assigned to the common assignee of the present invention.

SUMMARY OF PROBLEM AND INVENTION

The above-noted invention provide apparatus for indicating stress as a function of the relative reversible permeability wherein the magnetoabsorption apparatus discloses but is not limited to use with a sensing or detection coil placed concentrically about a member having axial stress. In cooperation with magnetoabsorption apparatus, the preferred embodiment shown in said copending disclosure, the present invention enables minute observations of materials having a variety of shapes and sizes. Moreover, the present invention obtains indications of stress magnitude and direction, with the distinction between tension and compression indicated by the sign of the stress magnitude.

One problem that which the present invention is uniquely qualified to solve is that of mapping the changes in direction and magnitude of stress in a member. When considering the stress in circular member under tension, one is faced with a text book problem for which the solution is easily calculated. However, in considering a structural member having an irregular shape and subjected to loads from a number of directions, knowledge of the stress at a particular point in the structural member is difficult to obtain. Therefore, with a view of the above noted problem and others related to stress detection and indication, the present invention has as one object to provide new and improved sensing apparatus for use with magnetoabsorption apparatus moveable over the exterior of metallic members to respond to regions of stress variations for sensing the stress on magnetoabsorption reflection into the sensing apparatus.

Another object of the present invention is to provide a new and improved sensing apparatus for use with magnetoabsorption apparatus having magnetic bias circuitry forming magnetic fields in the member which are cancelled in the sensing apparatus.

Another object of the present invention it to provide a new and improved sensing apparatus for magnetoabsorption apparatus wherein a probe is made available for scanning small flaws in structural members, with a view of detecting flaws of a size calculated to materially alter loading of the structural member.

An important object of the present invention is to provide a new and improved double-wound coil having the form of a pair of back-to-back crescents of semicircles insensitive to magnetic bias fields and yet responsive to the small perturbations of the magnetic coupling between the ferromagnetic member and the coil with reflections of impedance changes having a measurable and proportional indication relative to the stress in the member.

Yet another object of the present invention is to provide a new and improved detection coil for a marginal oscillator in magnetoabsorption apparatus wherein the relative portion of the member within the radio frequency field is minimized to obtain a favorable signal to noise ratio.

Still a further object of the present invention is to provide new and improved magnetoabsorption means for measuring the stress gradient in structural members.

One object of the present invention is to provide a new and improved detection apparatus for finding small anomalies and inclusions within structural materials.

Another important object of the present invention is to provide a magnetic bias field for a member being measured in which the coils generating the bias field are external to the member so that the magnetoabsorption apparatus can be used on flat plates, bars, sheets, powdered materials, and a great variety of material sizes and shapes.

Yet another object of the present invention is to provide a magnetic bias field from ferromagnetic or air cored coils which has a well-defined and limited direction such that the bias coil is used to determine the direction of the stress in the member.

Other objects and advantages of the present invention will become more readily apparent from a consideration of the specification and drawing wherein.

Figure 1:
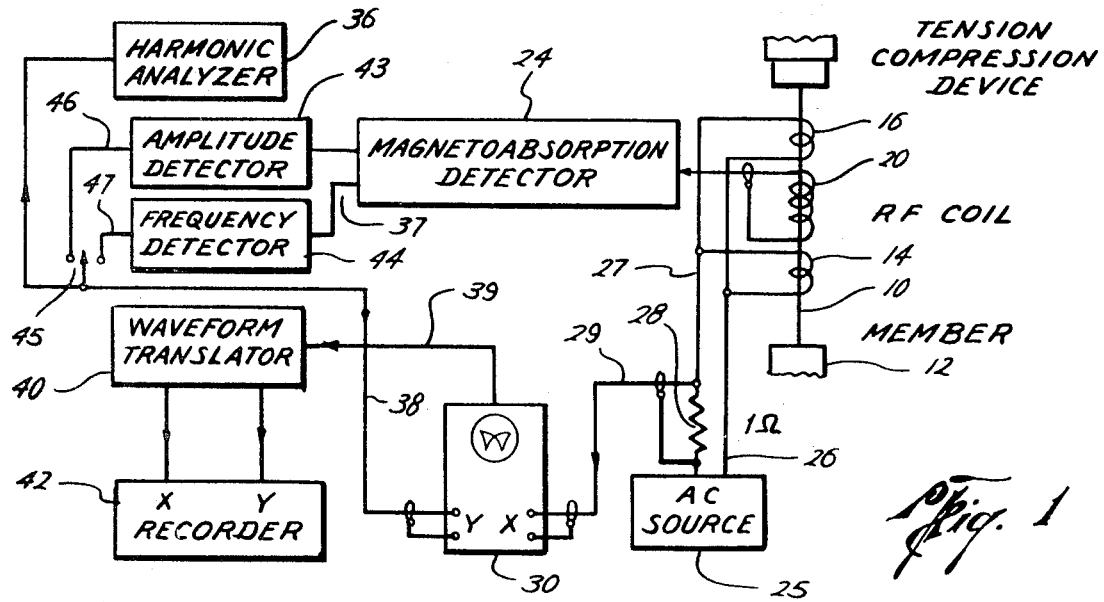
FIG. 1 is a schematic block diagram of magnetoabsorption apparatus for measuring the stress in a specimen.

Attention is first directed to FIG. 1 which illustrates in schematic block diagram form the magnetoabsorption apparatus indicated generally at 8 for measuring the stress in a specimen or a member 10. The member 10 is shown in FIG. 1 engaged with the means 12 which stresses the member by placing the member 10 in tension or compression to obtain an indication of magnetoabsorption as will be described. FIG. 1 also illustrates a marginal oscillator 24 which communicates a high-frequency signal to a radiofrequency coil 20 placed between a pair of bias field coils 14 and 16. Current flow is provided to the coils 14 and 16 by means of an alternating current source 25 communicating through a pair of electrical conductors 26 and 27. A series resistor 28 in the conductor 27 furnishes a voltage waveform supplied by the conductor 29 to an oscilloscope 30. Oscilloscope 30 presents a graphic representation of the magnetoabsorption signal. As was also described in the above-noted disclosure, the output of the marginal oscillator means 24 is provided to a harmonic analyzer 36 through either the amplitude demodulator 43 or the frequency detector 44. The analyzer 36 measures the amplitude and phase of each of the sinusoidal components of the periodic wave form shown by the oscilloscope 30. In addition, either the magnetoabsorption amplitude or frequency signal is conducted by the conductor 38 to the Y-input of the oscilloscope 30 to provide the Lissajous pattern. Also, the conductor 39 conducts the horizontal and vertical signals to the oscilloscope to the wave form translator 40 with the output communicated to an X-Y recorder 42. As was described in the previously noted disclosure the apparatus in FIG. 1 forms both a pictorial representation and an analytical representation of the magnetoabsorption signal derived from the member 10 which is subjected to a variety of load conditions. Of particular interest in FIG. 1 is the detection coil means 20 and the magnetic bias field coils 14 and 16 as will be noted in greater detail hereinafter.

Figure 2:
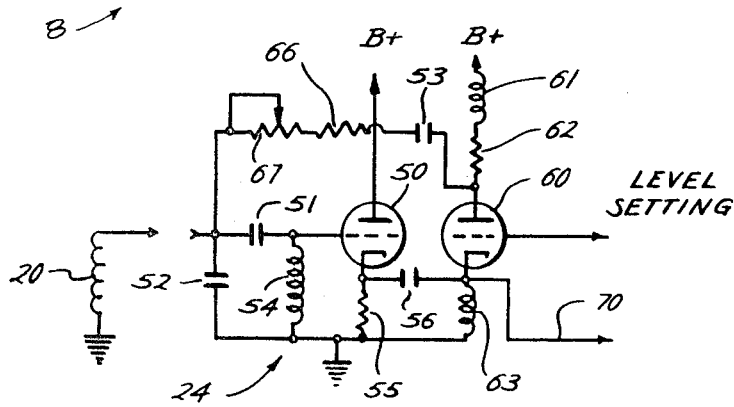
FIG. 2 is a schematic wiring diagram of a marginal oscillator circuit for use with the present invention.

Attention is next directed to FIG. 2 which illustrates the coil 20 in an operative relationship to the marginal oscillator means 24. While FIG. 2 illustrates one form of the oscillator means 24 in detail, other oscillator circuits may be used in lieu of the illustrated oscillator. Coil means 20 is communicated to the input circuitry of the grid of a triode vacuum tube 50. The signal is input through a coupling capacitor 51 with lower frequencies grounded through inductor 54. A parallel resonant circuit including sensing coil means 20 and a capacitor 52 is tuned to approximately the operating frequency of the oscillator means 24. Deviation from the tuned peak of the antiresonant circuit provides a minimum input to the triode 50. The input signal to the grid controls the current flow in the plate circuitry which has no series load. However, current flow through the cathode circuitry develops a proportional and in-phase signal across the cathode resistor 55 from which the signal for the next stage is derived through a coupling capacitor 56. It will be recognized by those skilled in the art that the triode 50 is used as a cathode follower within the amplifier portion of the oscillator means 24.

An additional triode 60 has a plate load of a series inductance 61 and resistor 62. The cathode has a series coil 63 to provide adequate interstage coupling at the selected frequency of the oscillator 24, and the coil 63 decreases the coupling at other frequencies including the magnetic bias frequency. The grid of the triode 60 is communicated with some DC bias source which provides an adjustable level control for the apparatus whereby the level of oscillations is determined by the level setting.

A positive feedback loop is connnected to the plate of the triode 60 and is returned to the input stage. The feedback loop incorporates a series capacitance 53, a fixed resistor 66, and an adjustable resistor 67. The feedback signal is adjusted by resistor 67 for addition to the signal from the coil means 20 to sustain oscillations by the oscillator means 24. As noted in the copending disclosure, the oscillator means 24 is maintained in an operating condition nearly causing the oscillations to cease. The in-phase feedback signal of conventional oscillators usually saturates the amplifier portion in most oscillators; however, the oscillator means 24 is operated at a point of operation wherein the oscillations are marginally sustained and the oscillator means is therefore relatively sensitive to changes in impedance in the coil means 20. The marginal oscillators from the oscillator means are supplied by the conductor 70 connected to the cathode of the triode 60.

Figure 3:
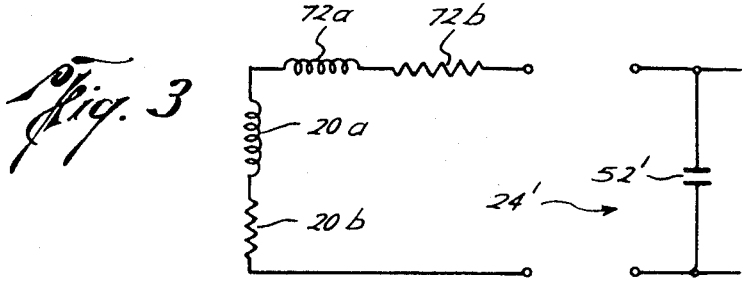
FIG. 3 is a series resonant circuit for coupling the detection coil means to the marginal oscillator.
Figure 4:
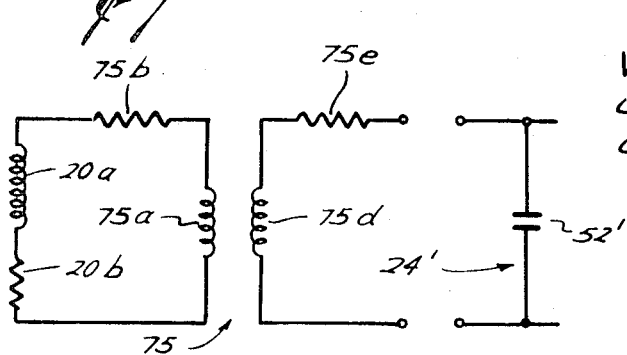
FIG. 4 is a transformer coupling circuit for coupling the detection coil means to the marginal oscillator.

Considering the coil means 20 of the present invention, attention is next directed to FIGS. 3 and 4 for appropriate coupling circuits which are preferably inserted between the coil means 20 and the oscillator means 24. FIG. 3 illustrates a series inductance for coupling the coil means 20 to the marginal oscillator means 24. In FIG. 3, the coil means is represented as including an inductance 20a and a series resistance 20b. Suitable additional inductance is added at 72a and, of course, the inductor 72 has its series resistance 72b. The input to the marginal oscillator means 24 is represented by the arrow 24' and for purposes of FIG. 3, can be said to include an equivalent capacitor 52'. Since the number of turns in the coil 20 is preferably minimum to keep its size small, and since the capacitance 52' is somewhat large, the preferred embodiment of the series resonant circuit adds a sizeable inductor 72a to the sensing coil means whereby small deviations in the inductance 20a produces a substantial change in the operation of the oscillator means 24. Moreover, since signal amplitude is proportional to the ratio of inductance to capacitance, an increase of the total inductance in the series circuit yields a proportional increase in signal amplitude over the signal from coil 20a only. This further improves the signal to noise ratio of the apparatus and prevents misinterpretations of data resulting from a noisy signal.

In view of the present disclosure, those skilled in the art may calculate the inductance 72a to be added in the series circuit to provide proper tuning of the oscillator means 24 when the coil 20 is made small in physical dimensions to obtain high sensitivity to small defects.

FIG. 4 provides an alternative input circuit including a coupling transformer means 75. Again, the inductance of the coil means is represented at 20a in series with the resistance 20b. The primary 75a of the transformer 75 includes an equivalent series resistance 75b. The secondary 75d of the transformer 75 includes its own series resistance 75e. Again, the input impedance of the marginal oscillator means as viewed at 24' is the equivalent capacitance 52'.

Those skilled in the art are familiar with the utilization of a transformer having a designated turns ratio for multiplying the transformer load to match the impedance of the transformer input circuit. Similarly, with a view of obtaining a substantial signal deviation or variation from small change in impedance 20a, the coupling transformer means 75 provides proper impedance matching with the input impedance of oscillator 24'. The inductance 75d plus that reflected from the primary, is resonated at the oscillator operating frequency by capacitance 52'.

Figure 5:
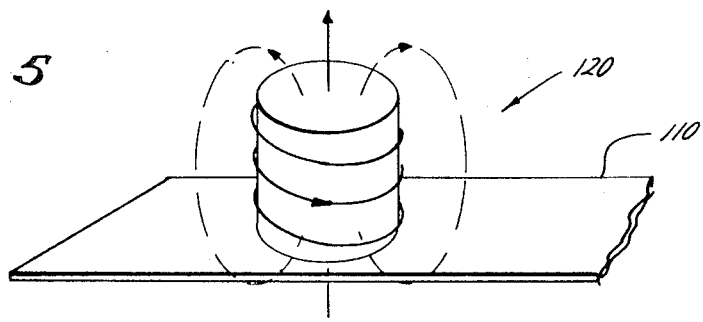
FIG. 5 is a representation of the magnetic coupling between a cylindrical probe and a specimen.

Attention is next directed to FIG. 5 which illustrates a cylindrical coil 120 positioned adjacent to a ferromagnetic member 110. Several facts should be noted concerning the arrangement of the coil means 120 relative to the member 110. In the first instance, the coil 120 is preferably in the range of 10–100 mils in diameter (inside) to permit minute observation of the specimen 110. The number of turns is preferably small, perhaps less than ten, and they are spaced relatively close together. The form on which the coil is wound is preferably an insulating material such as a plastic and is constructed and arranged for supporting the coil means 120 relative to the specimen 110. When using a very fine wire, the series resistance is not negligible although no particular problem is presented in this regard.

Concerning the specimen or member 110, the above-noted disclosure describes the dependence of the relative reversible permeability on the stress which fact is useful in the magnetoabsorption techniques of the present invention. It was therein noted that if the member is a nonferromagnetic material, a thin film of ferromagnetic material is preferably plated or otherwise attached to the member for stressing therewith to enable the apparatus to obtain magnetic coupling between specimen and coil.

A bias field of relatively low frequency is formed in the member 10 by the coils 14 and 16 (see FIG. 1) which enables the present invention to sense stress variations by using the relationship between the stress and the relative reversible permeability wherein variations in stress are reflected into the coil as changes in impedance, both the loss term and the reactance, with increasing stress. Viewing FIG. 5 again, it should be noted that the bias field is preferably contained fully within the specimen and therefore, is not graphically indicated. As long as the bias field is in the member 110, it induces no signals in the specimen coil 120 and has no effect on output signals of the present invention. This small coil shown in FIG. 5 which has only a few turns and low inductance is usually used with the coupling systems of FIG. 3 or FIG. 4.

Within the needs of the user, the coil 120 can have any diameter from 0.1 inch up to several inches. If the coil 120 is large, sufficient inductance permits it to resonate directly with the capacitance 52, and the coupling schemes of FIGS. 3 and 4 are usually not needed.

In operation, the detection coil 120 is preferably positioned with its major axis approximately perpendicular to the face of the ferromagnetic material 110. This provides coupling to the specimen 110 as represented by the field lines in FIG. 5. As the stress in the specimen is altered, the loss term and the inductance term of the impedance of the coil means 120 are altered and the change is reflected into the marginal oscillator means 24. Changes in the signal from the magnetoabsorption means 24 are proportional to the stress in the member 110. Of course, reference is made to FIGS. 3 and 4 for appropriate coupling circuits means for communicating the small impedance of the coil 120 to the oscillator means 24 to obtain adequate magnetoabsorption signals from small sensing coils. The circuit means may be only a wired connection of the sensing coil means when the coil means has a sizeable impedance.

Figure 6:
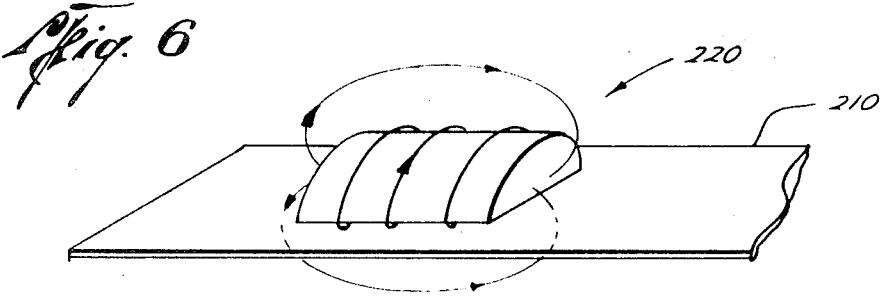
FIG. 6 is a representation of the magnetic coupling between a semicylindrical shaped probe and the specimen; and, FIG. 7 is a representation of the magnetic coupling of a pair of semicylindrical coils and the specimen.

Attention is next directed to FIG. 6 which illustrates a coil means 220 which is wound on the form best described as one-half of a cylinder. The coil means 220 is placed adjacent to a specimen 210 for obtaining indications of the stress therein. The specimen 210 is similar to the member 110 previously described and includes either a ferromagnetic film or is substantially a ferromagnetic material alloy. The low frequency bias field is formed in member 210 to provide the basis of the stress-relative reversible permeability relationship previously noted.

The semicylindrical shape of the coil 220 shown in FIG. 6 is useful in detecting stress direction. For instance, if the stress in the specimen 210 shown in FIG. 6 is lengthwise of the major dimension of the structure, the coil means 220 is oriented with its major axis extending parallel thereto for optimum coupling. However, if the major axis of the coil means 220 is turned to an angle relative to the length of the member 210, it will be appreciated that the magnetoabsorption signal is materially changed. The change in signal as a function of change in position of the coil indicates the direction of the stress in the specimen 210.

Figure 7:
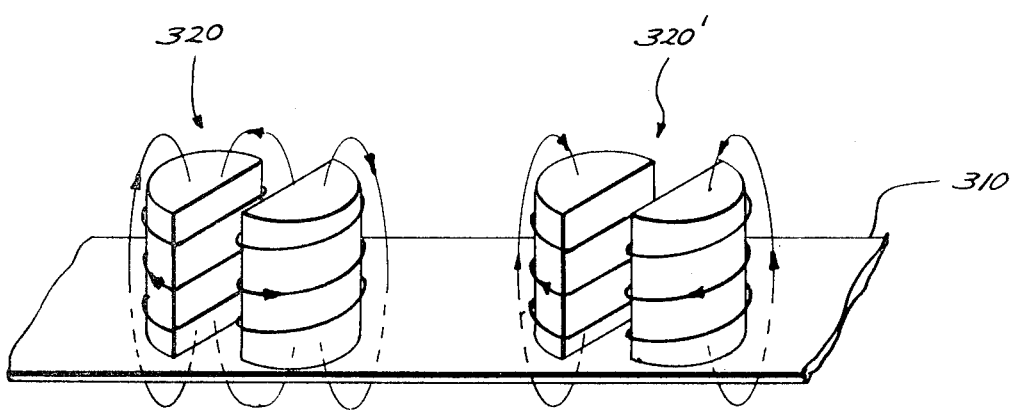

Attention is next directed to FIG. 7 which illustrates a pair of semicylindrical coil forms indicated at 320 arranged with their major axes parallel to one another. Coil means 320 is positioned adjacent to specimen 310 for measuring the stress therein. When the major axes of the coil means 320 are positioned approximately perpendicular to the specimen 310, cancellation of unwanted bias field signals in the coil means 320 is obtained. In operation, the coil means 320 is directionally sensitive so the movement of the coil means 320 over the surface indicates stress intensity as a function of the direction. On rotation of the coil means 320 to obtain the optimum stress signal, and indication of stress direction is obtained. The coil means 320 can also be used to measure stress gradients.

The series aiding connection of the coil means 320 of FIG. 7 yields a minimum induced voltage when the magnetic field is parallel to the major axes of coils 320 and when the magnetic field is perpendicular to the major axes. Therefore, the arrangement of coil means 320 can be used when the coil means 320 must be mounted in the bias field (see FIG. 1 for an example). The series aiding arrangement reduces coupling from the bias field to a minimum for increased sensitivity to magnetoabsorption signals.

Reference is also made to the coil forms 320' shown in FIG. 7 which are wound with series opposing coils. Series opposing coils are useful in measuring stress and magnetic field gradients in specimen having a variety of field configurations. It should be noted that the series opposing coils 320' do not cancel external bias fields.

For additional details concerning operation of the sensing apparatus presently disclosed, reference is first made to the above-noted copending disclosure which discusses in greater detail the relationship of stress to the relative reversible permeability of the member undergoing stress. Moreover, reference is made to the several graphic representations of the data illustrating the magnetoabsorption signal as a function of stress. Likewise, reference is made to the harmonic content of the magnetoabsorption signals as interpreted by the harmonic analyzer 36 shown in FIG. 1 for an additional indication of the variations of the signal as a function of the stress in the member. Without further elaboration it is believed that operation of the present invention is readily apparent to those skilled in the art.

The present invention is useful in obtaining directional indications of stress, strain, or magnetic fields. Moreover, the small coil configurations claimed herein are useful in obtaining localized stress magnitude and directions in larger structural members, stress gradients, indications of locally fatigued areas, visible and invisible cracks which cause stress concentrations, variations resulting from heat treatment work hardening, and anomalies or inclusions not apparent at the surface of the material.

In operation of the present invention the preferable frequency for the bias field is the 60 Hz. signal provided by the commercial power companies for ease and convenience although frequencies from a few hertz to several thousand hertz have been used, and the preferred frequency for the marginal oscillator is in the radiofrequency range, and can vary from a few hundred kilohertz into the gigaHertz range.

While FIG. 2 discloses a vacuum tube oscillator means 24, it will be appreciated that transistorized circuitry is available for use in the present invention and may be incorporated therein. Also, the marginal oscillator means 24 shown in FIG. 2 may be associated with additional stages of amplification for providing appropriate signal amplitudes to various and sundry indicating devices operated with the present invention. In this regard, reference is made to both broad-banded amplifiers and tuned amplifiers having a frequency centered on the radio frequency selected for the operation of the marginal amplifier means 24, and the amplitude and frequency of FIG. 1.

Among the many different ways to apply the magnetic bias field through the coils 14 and 16, representative configurations are included in FIGS. 1, 8, 9 and 10 for use with the radio frequency coil means previously described. As described in the copending disclosure, the magnetic bias field is used to vary the relative reversible permeability of the member preferably through its complete range in a cyclic manner to obtain the magnetoabsorption Lissajous pattern noted in the copending disclosure. Stress in the member alters the magnitude of the magnetoabsorption signals.

The magnetoabsorption signals vary as a function of the angle between the magnetic bias field and the stress direction. For some measurements, the direction of the magnetic bias field must be readily available and, for many determinations, the field must be confined to a specific area.

The bias field coils 14 and 16 or FIG. 1 are similar to the well-known Helmholtz coil system for producing magnetic fields. The axis of the radiofrequency coil 20 can be parallel to the bias field direction or perpendicular to it, and the coil 20 is not required to encircle the member 10 as shown in FIGS. 5, 6 and 7. However, encircling coils 14 and 16 are available for samples of any shape which can be inserted through the coil 20 and the bias coils 14 and 16. For small samples, the angle of the bias field in specimen can be varied by rotating the sample.

Figure 8:
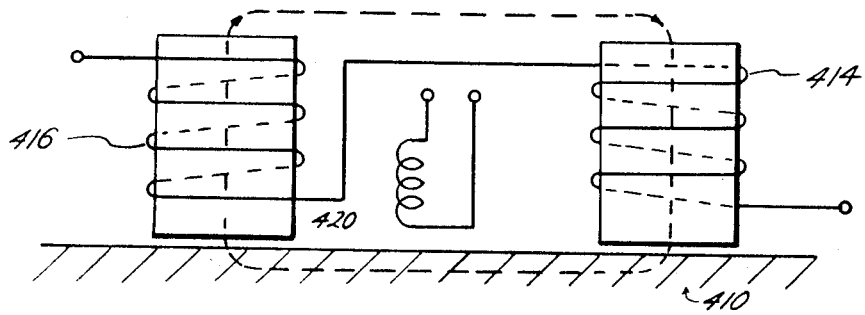
FIG. 8 is a representation of the magnetic bias field being supplied by two air-cored coils with the sensing apparatus between them.
Figure 9:
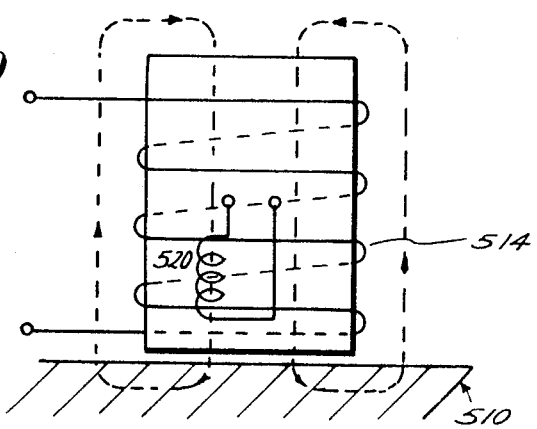
FIG. 9 is a representation of the magnetic bias field being supplied by one air-cored coil with the sensing apparatus positioned for detecting stress in the member; and, FIG. 10 is a representation of the magnetic bias field from a coil with a ferromagnetic core with the magnetic scanning apparatus located at a position, inducing no bias signals in the sensing apparatus.
Figure 10:
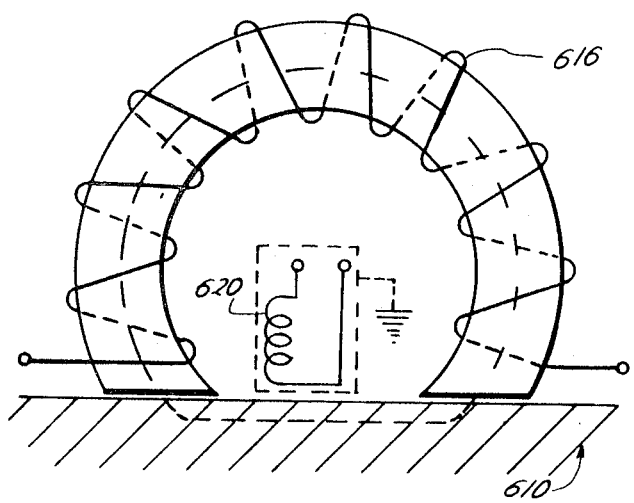

When the member 10 does not accommodate encircling Helmholtz coils 14 and 16, then coil arrangements such as shown in FIGS. 8, 9 and 10 may be used. FIG. 8 illustrates use of two air-core coils 414 and 416 to form the magnetic bias field in the member 10 as shown in FIG. 8. The direction of the bias field is shown in dotted line of FIG. 8 encircling the sensing apparatus 420 which has only minimum coupling, preferably none, to the bias field.

In circumstances in which it is difficult to encircle a specimen with a bias coil and no single direction for the bias field is desired, then a single air-cored bias coil 514 surrounds the radiofrequency coil 520 as shown in FIG. 9.

For battery powered systems or in circumstances in which power must be conserved, the ferromagnetic core 616 shown in FIG. 10 is preferred. In FIG. 10, the radiofrequency coil 620 is at least partially shielded against noisy signals from the ferromagnetic core and bias field. Again a unidirectional bias field is obtained by use of the coil means 616 as shown by the dotted line of FIG. 10.

While the foregoing discloses the preferred embodiment of the present invention, the scope of the present invention is described by the appended claims.

We claim:

1. Magnetoabsorption apparatus adapted for detecting characteristics indicative of stresses developed in a metallic specimen being deformed by forces applied thereto and comprising: magnetic biasing means for generating and applying a low-frequency alternating magnetic field in a portion of said specimen along a particular direction; radiofrequency oscillator means including a detecting coil placed on a specimen adjacent to said magnetic biasing means for producing an RF magnetic field in said portion of said specimen, the output of said oscillator changing in response to stress changes developed in such a specimen, said coil having two portions wound in semicylindrical configuration, the flat portions of said semicylindrical coils being parallel and adjacent one another, and the axis of said coils being perpendicular to said specimen; and circuit means coupled to said oscillator means and responsive to said oscillator output for providing indications representative of stresses developed in such a member as said coil portion is oriented in said selected manner.

2. The apparatus of claim 1 wherein said coil portions are wound in a series-aiding relationship to reduce coupling with said magnetic field.

3. The apparatus of claim 1 wherein said coil portions are wound in a series-opposing relationship to not limit coupling with said magnetic field.